(12) United States Patent
Jaeschke

(10) Patent No.: US 12,173,844 B2
(45) Date of Patent: Dec. 24, 2024

(54) HIGH EFFICIENCY SEAL OIL SYSTEM

(71) Applicant: CIRCOR PUMPS NORTH AMERICA, LLC, Monroe, NC (US)

(72) Inventor: Axel Jaeschke, Lehrte (DE)

(73) Assignee: CIRCOR PUMPS NORTH AMERICA, LLC, Monroe, NC (US)

( * ) Notice: Subject to any disclaimer, the term of this patent is extended or adjusted under 35 U.S.C. 154(b) by 0 days.

(21) Appl. No.: 18/282,680

(22) PCT Filed: Mar. 26, 2021

(86) PCT No.: PCT/US2021/024395
§ 371 (c)(1),
(2) Date: Sep. 18, 2023

(87) PCT Pub. No.: WO2022/203683
PCT Pub. Date: Sep. 29, 2022

(65) Prior Publication Data
US 2024/0183491 A1    Jun. 6, 2024

(51) Int. Cl.
*F16N 7/40*     (2006.01)
*F04C 14/08*   (2006.01)
(Continued)

(52) U.S. Cl.
CPC ............. *F16N 7/40* (2013.01); *F04C 14/08* (2013.01); *F04C 15/0003* (2013.01);
(Continued)

(58) Field of Classification Search
CPC .. F16N 29/00; F16N 7/40; F04C 14/08; F04C 15/0003; F01M 2001/0292
See application file for complete search history.

(56) References Cited

U.S. PATENT DOCUMENTS 4,108,569 A * 8/1978 Ryall .................... F04D 29/126
                                                      415/113
4,734,266 A * 3/1988 Van Driesen ......... F04D 29/108
                                                      415/113
(Continued)

FOREIGN PATENT DOCUMENTS

DE    202006008948 U1    8/2006
DE    102016217061 A1    3/2018
(Continued)

OTHER PUBLICATIONS

International Preliminary Report on Patentability for International application No. PCT/US2021/024395, Date mailed Oct. 5, 2023, 5 pages.
(Continued)

*Primary Examiner* — Michael A Riegelman
(74) *Attorney, Agent, or Firm* — KDW Firm PLLC

(57) ABSTRACT

A hydraulic system, for example a seal oil system, includes a hydraulic feeding pump having a motor, a hydraulic motor having a generator, a cooler and a storage tank for receiving hydraulic fluid. The hydraulic feeding pump is configured to draw hydraulic fluid from the reservoir and to direct the fluid to one or more consumers (for example mechanical seals). The hydraulic motor installed downstream of the consumer drives an electric generator. The generator can be coupled to a VFD which controls the speed of the hydraulic motor. The electric power, generated by the generator, is fed back into the power grid.

13 Claims, 2 Drawing Sheets

(51) Int. Cl.
  *F04C 15/00* (2006.01)
  *F16N 29/02* (2006.01)
  *F16N 13/20* (2006.01)

(52) U.S. Cl.
  CPC .......... *F04C 15/0088* (2013.01); *F16N 29/02* (2013.01); *F04C 2270/051* (2013.01); *F16N 2013/205* (2013.01); *F16N 2210/16* (2013.01); *F16N 2270/70* (2013.01)

(56) References Cited

U.S. PATENT DOCUMENTS

| | | | | |
|---|---|---|---|---|
| 5,147,015 | A * | 9/1992 | Snuttjer | F16N 39/02 184/104.1 |
| 5,795,135 | A * | 8/1998 | Nyilas | F16N 17/00 417/372 |
| 2012/0241258 | A1 * | 9/2012 | Subramaniam | F16N 7/40 184/6.4 |
| 2016/0084111 | A1 * | 3/2016 | Bei | F01D 11/06 415/111 |
| 2017/0350397 | A1 * | 12/2017 | Coeckelbergs | F04C 25/02 |
| 2018/0291895 | A1 * | 10/2018 | Afshari | F04C 14/08 |
| 2021/0131321 | A1 * | 5/2021 | Tomescu | F16N 7/40 |
| 2023/0052329 | A1 * | 2/2023 | Hall | F04C 15/0038 |
| 2024/0183491 | A1 * | 6/2024 | Jaeschke | F04D 29/128 |

FOREIGN PATENT DOCUMENTS

| | | |
|---|---|---|
| DE | 102017206415 A1 | 10/2018 |
| EP | 3427803 A1 | 1/2019 |
| WO | 2022203683 A1 | 9/2022 |

OTHER PUBLICATIONS

International Search Report and Written Opinion mailed Jul. 1, 2021, for application No. PCT/US2021/024395 (six (6) pages).

* cited by examiner

HIGH EFFICIENCY SEAL OIL SYSTEM

This is a national stage application filed under 35 U.S.C. § 371 of pending international application PCT/US2021/024395, filed 26 Mar. 2021, the entirety of which application is hereby incorporated by reference herein.

FIELD OF THE DISCLOSURE

The present disclosure relates generally to a pressure controlling lube oil system, and more particular to a high efficiency barrier fluid or seal oil system for double seals for pumps.

BACKGROUND OF THE DISCLOSURE

Seal Oil Systems (SOS) are required to provide barrier fluid to double-mechanical seals of positive displacement pumps. Double-mechanical seals consist of two single mechanical seals in series. The compartment between the seals are liquid filled and pressurized to a suitable pressure which typically is higher than the process pressure at one of the mechanical seals. The secondary mechanical seal is typically exposed to atmospheric pressure.

Mechanical seals generate frictional heat which needs to be removed to avoid overheating the seals. Part of the heat is dissipated into the process fluid, while some is cooled down by the barrier fluid. Depending on the pumping application, process temperature and pressure can vary in a wide range and can change quickly. In many cases the start and stop process of the pump is the most challenging due to the presence of wide pressure fluctuations (i.e., draw down of suction pressure) and temperature fluctuations (i.e., heat up process of the fluids).

The SOS needs to provide sufficient flow to cool the seal at exactly the right pressure. The SOS also needs to react fast enough to follow process changes. Further, the SOS needs sufficient cooling power to cool the heat generated by the seals and the energy (heat) introduced into the system by the hydraulic pump.

Several different seal oil plans are suggested and documented in American Petroleum Institute (API) 682. The most flexible seal plan is considered Plan 54 in which an external flow and pressure system provides barrier fluid to one or more seals. A typical Plan 54 system holds a larger amount of barrier fluid oil in its storage tank. From there, a hydraulic pump (often a gear pump or a 3-screw pump) moves the required flow from the tank, through optional filters to the seals installed on the pump. The return fluid pressure is controlled by a pressure control valve (PCV) which controls the seal oil pressure. Downstream of the PCV the fluid pressure is close to atmospheric pressure and a low-pressure cooler can be used to cool the seal fluid. The cooled seal fluid can flow back into the tank for reuse.

The cooler may be designed to cool the heat coming from the seals and the heat/friction losses of the hydraulic pump. The PCV is typically a throttle valve which can "destroy" the pressure energy in the fluid. Because destruction of energy translates into heat, the shaft power provided by the hydraulic pump is essentially converted into heat at the PCV.

FIG. 1 shows an example SOS 1 including a SOS hydraulic pump 2 with motor 4, a main pump with seals 6, a PCV 8, a cooler 10 and a seal fluid reservoir 12. The seal fluid reservoir 12 holds a quantity of seal oil, the SOS hydraulic pump 2 defines the seal fluid flow and generates or develops seal fluid pressure, seal fluid flows through the main pump seals 6 and removes seal friction heat, the PCV 8 controls the SOS pressure and reduces the pressure of the seal fluid to return it to the reservoir pressure. The depressurized seal fluid is cooled within cooler 10 before it is returned to the seal fluid reservoir 12. It will be appreciated that additional equipment such filters, strainers, one or more check valves, one or more safety valves, instrumentation, sight glasses, etc. will be included in the system, but that such details are not shown because the use of such components follows normal industrial standards and are not critical to the present invention.

An example that will be described in relation to FIG. 1 identifies some typical flow and heat calculations for a SOS 1 used with main pump 6 consisting of a medium sized Twin-Screw-Pumps (4 mechanical seals). The higher the barrier fluid pressure, the more shaft power is required to provide the correct flow and pressure.

As simple example is as follows:
 4 double seals per pump, 2.5 kiloWatt (KW)s per seal-→generate a total 10 kW of heat
 No heat exchange between seals and process fluid
 Barrier fluid pressure 5 to 60 bar
 Circulated barrier fluid (oil): 50 liters/minute
 Hydraulic pump shaft power: 6 kW The cooler 10 according to this example should be designed to remove about 16 kW heat from the lube oil flow (10 KW of heat from the seals, and about 6 kW of heat coming from the hydraulic pump). Even though 6 kW does not seem to be much, over the typical lifetime of a seal oil system of 20 years the total power consumption of the hydraulic pump will add up to around 1,000,000 kWh which translates to approximately 100,000 USD in energy cost.

It would be advantageous to provide an improved seal oil system that reduces the total power consumption of the seal oil system.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A seal oil system includes a hydraulic pump having a motor, the hydraulic pump configured to draw seal oil from a reservoir and to direct the seal oil to a seal region of a process pump, a hydraulic motor having a motor/generator, the hydraulic motor coupled downstream of the seal region of the main pump to receive the seal oil from the seal region of the process pump, and at least one variable frequency drive (VFD) coupled to the motor/generator. The at least one VFD is configured such that energy generated by the motor/generator, driven by the hydraulic motor, is fed into a power grid from which the hydraulic pump draws energy.

The hydraulic pump and the hydraulic motor can be positive displacement pumps. The hydraulic pump and the hydraulic motor are selected from the list consisting of three-screw (3S) pumps, two-screw (2S) pumps, vane pumps, progressing cavity (PC) pumps, gear pumps, and lobe pumps. The seal region of the process pump comprises one or more double mechanical seals.

The seal oil system can include a cooler coupled to the hydraulic motor to receive the seal oil from the hydraulic motor and to cool the seal oil therein. A speed of the hydraulic pump is controlled via a gear box or a VFD. The hydraulic pump, the motor/generator, and the VFD comprise a pressure-reducing pressure-control valve (PR-PCV). The hydraulic pump is configured to feed one or more consumers, such as seal units, wherein several said PR-PCVs are provided in parallel to control flow and pressure for several consumers independently.

In some embodiments, the at least one VFD comprises a two axis VFD to control a speed of the hydraulic pump and to control a speed of the hydraulic motor. The two axis VFD can be configured to feed energy generated by the motor/generator to the motor of the hydraulic pump. The seal oil system can further include a controller for monitoring a speed of the hydraulic pump and a speed of the hydraulic motor, and to determine when a difference between the hydraulic pump speed and the hydraulic motor speed exceeds a predetermined value, and to generate an alarm. In some embodiments, the speed of the hydraulic motor is controlled by a mechanical speed control device such as a gear box or hydraulic coupling. In other embodiments, the hydraulic pump controls system pressure and the hydraulic motor controls system flowrate.

BRIEF DESCRIPTION OF THE DRAWINGS

By way of example, a specific embodiment of the disclosed device will now be described, with reference to the accompanying drawings, in which.

Figure 1:
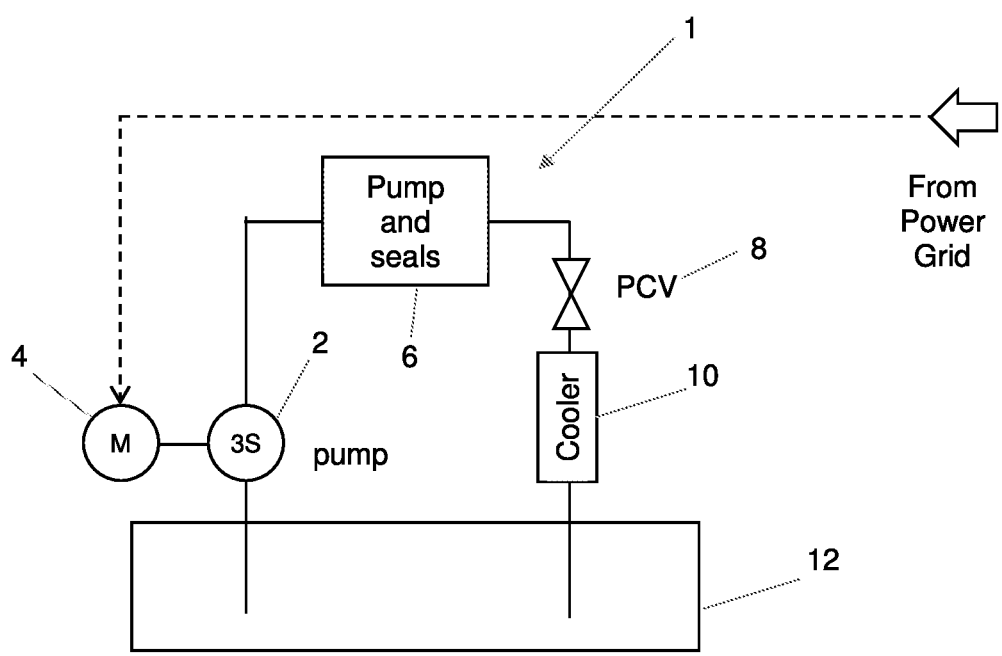
FIG. 1 is a schematic of a conventional seal oil system.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

DETAILED DESCRIPTION

Numerous embodiments of an improved seal oil system in accordance with the present disclosure will now be described more fully hereinafter with reference to the accompanying drawings, in which preferred embodiments of the present disclosure are presented. The systems of the present disclosure may, however, be embodied in many different forms and should not be construed as being limited to the embodiments set forth herein. Rather, these embodiments are provided so that this disclosure will convey certain example aspects of seal oil systems to those skilled in the art. In the drawings, like numbers refer to like elements throughout unless otherwise noted.

As mentioned, it would be desirable to minimize the power consumption of a seal oil systems (SOS). One approach would be to minimize the frictional heat generated by the seals by adjusting the seal oil pressure to the minimal safe barrier fluid pressure. In many cases the maximum process pressure occurs only temporarily, such as during start/stop or during extreme operating conditions. A reliable and fast adjustment of the barrier fluid pressure is one way to reduce the power consumption of the hydraulic pump.

A second approach is to adjust the seal oil flow rate to match the actual seal heat which is directly dependent on the operation conditions of the main pump. Lower seal-rotational-speed will cause less seal friction heat. Lower fluid pressures will also cause less seal friction heat. Less heat means, that less cooling fluid is required. An additional approach is to reduce the hydraulic pump speed when possible. This would require installation of a variable-frequency-drive (VFD) to control the motor speed of the hydraulic pump. Both methods help to reduce the power consumption of the hydraulic pump The problem with the above concept, however, is that conventional PCVs typically have a limited operating range. The combination of wide flow range and wide pressure range can quickly bring a standard PCV to control stability limits and can require more complex and expensive valves or limitations in the hydraulic pump speed range. Additionally, the pressure energy of the fluid is still converted in heat.

Pressure Recuperating Pressure Control Valve (PR-PCV)

Three-screw (3S) pumps are positive displacement machines that form closed chambers to generate fluid flow, which is directly controlling by pump speed, from the inlet to the outlet of the machine. Usually these 3S machines are operated as pumps. But hydraulic motors are also well known in the industry, using hydraulic flow and pressure to move other equipment, often other pumps, but also for example an electric generator. 3S machines can operate well as hydraulic motors. 3-screw (3S) machines are known for their very good efficiency, typically in the range of 80 to 95%. This is true for pumps as well as for motor operation of the 3S machine.

Modern VFDs are reliable and cost efficient and can control the operation of pumps and hydraulic motors by controlling the speed of the attached electric motor or generator. An advantage of VFDs is that, when coupled to an associated power grid, they can adjust the motor/generator operational frequency, and consequently the speed either in power consumption as well as power recuperating operation. The first is required when operating a motor, the second becomes the case when operating a generator. Some modern VFDs can feed energy back into the power grid when they operate as electrical generators.

Similar to the manner in which pumps control process pressures by adjusting pump-speed, the same can be done with hydraulic motors. In case of a SOS, the hydraulic pump sets the required flow rate, and the motor adjusts its speed and throttles back as much or as little as required to maintain a required barrier fluid pressure. Simple but highly efficient and fast controllers in each VFD can be used to conduct the different tasks. The resulting energy savings can be used within the system. In some embodiments energy export to the main power grid will not occur because the electrical motor of the hydraulic pump will consume all the energy the generator and its hydraulic motor can recover.

Figure 2:
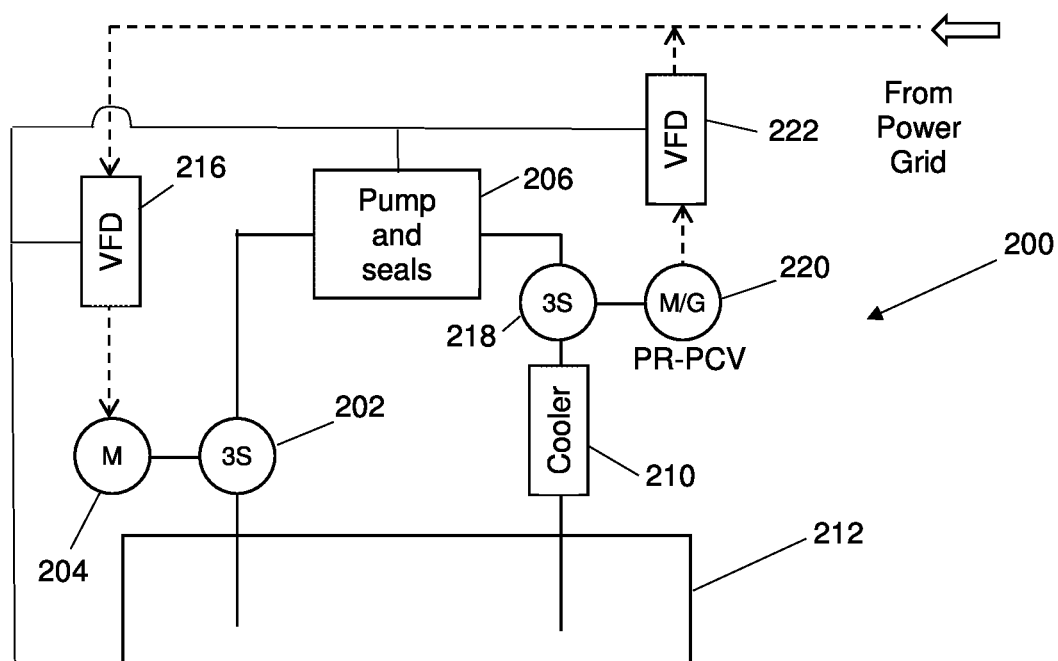
FIG. 2 is a schematic representation of an example of an embodiment of a high efficiency seal oil system in accordance with the present disclosure.
Figure 2:
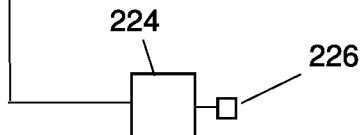

An example of the disclosed arrangement is illustrated in FIG. 2. The SOS system 200 includes a hydraulic pump 202 with motor 204, a main pump with seals 206 (referred to hereinafter as "process pump" 206), a cooler 210 and a seal fluid reservoir 212. In this embodiment, the motor 204 of the hydraulic pump 202 is controlled by a variable frequency drive (VFD) 216. A three-screw pump 218 (referred to hereinafter as "hydraulic motor" 218) is disposed downstream of the seals, typically between the main pump 206 and the cooler 210, and is coupled to a motor/generator 220, which in turn is connected to a VFD 222. As the hydraulic motor 218 is turned by the flow passing through it, the hydraulic motor drives the motor/generator 220 As will be understood, the hydraulic motor 218, motor/generator 220 and VFD 222, taken together, function as a Pressure-Reducing/Pressure-Control Valve (PR-PCV).

In some embodiments a controller 224 is connected to the VFD 216, VFD 222 and the process pump 206 to automatically control operation of the SOS 200. The controller 224 may include a non-transitory memory element 226 associated therewith for storing process parameters and the like.

Although a discrete controller 224 is shown, in some embodiments the SOS 200 may include VFDs 216, 222 that have individual built-in controllers.

Speed control of the hydraulic pump 202, main pump 206, and hydraulic motor 218 can be via mechanical speed control, hydraulic speed control, or electrical speed control (e.g., VFD). In some embodiments the hydraulic pump 202 may be run at constant speed. In other embodiments the hydraulic pump 202 can be run at variable speed to maintain the seal of the process pump 206 within a desired process range or a seal lifetime-optimized flow rate. In some embodiments speed of the hydraulic pump 206 is controlled to maintain a desired temperature range of the process fluid, the seal oil, or the seal itself. In other embodiments the hydraulic motor 218 may be run at a constant or variable speed to control the system temperature, while the hydraulic pump 202 may be run at variable speed to control the system pressure.

According to the invention, the hydraulic motor 218 (in some embodiments, a 3-screw pump) is operated based on pressure control, and functions like a pressure control valve (PR-PCV). Pressure energy from the fluid flowing in the SOS 200 is converted by the hydraulic motor 218 and motor/generator 220 into electrical power, reducing the heat load to the seal oil loop at the same rate.

In some embodiments the motor/generator 220 feeds electrical power back to a connected power grid via the VFD 222. In some embodiments the hydraulic pump 2020 draws power from the same power grid to which the motor/generator 220 supplies power. The power grid may, in some embodiments, be a local power distribution center coupled to the VFD 222 and/or VFD 216 via a fuse-coupled connection.

In some embodiments VFD 222 is electrically connected, either directly or indirectly, to VFD 216 so that electrical power generated by the VFD 222 is provided directly to the motor 204 of hydraulic pump 202. In some embodiments VFD 216 and VFD 222 are the same component (i.e., a 2-axis VFD) which operates both the hydraulic pump 202 and the hydraulic motor 218. In such instances the power generated by the hydraulic motor 218 is fed directly to the motor 204 of the hydraulic pump. In such embodiments no energy is fed into the power grid, but overall power drawn from the power grid by the motor 204 of the hydraulic pump 202 is reduced compared to conventional systems.

In other embodiments, an indirect electrical connection between the VFD 222 and VFD 216 means that power generated by the VFD 222 is provided to a connected electrical power grid (public or private), while the motor 204 of the hydraulic pump 202 draws power from that same electrical power grid. These are merely examples of electrical connection arrangements and are not critical to the invention.

In some embodiments, the hydraulic motor 218 controls pressure within the system by creating a hydraulic resistance to the seal oil flow. The resistance increases when the hydraulic motor 218 slows down, causing the seal oil pressure to increase. When the speed of the hydraulic motor 218 increases, hydraulic resistance within the system drops and the seal oil pressure is reduced. The hydraulic pump 202 will operate at a speed required to control the temperature at the mechanical seal and/or within the recirculation tank 212. When higher temperatures are sensed, more seal oil flow is required, which consequently requires the hydraulic pump to operate at a higher speed. Pressure may be detected at the seal or directly downstream of the process pump 206. Speed control can be implemented using simple setpoints or with a simple PID-controller (e.g., controller 224). For example, a PID controller 224 can use the required seal oil pressure as the setpoints and automatically adjust the speed of the hydraulic pump 202 using motor 214 while still maintaining a constant or required seal oil pressure.

As will be appreciated, the motor 214 of the hydraulic pump 202 consumes power from an attached power grid, while the VFD 222 of the hydraulic motor feeds/recuperates power back into the power grid. The balance of consumed power and recuperated power represents the power the user must purchase. In practice, the hydraulic motor 218 will never produce more power than that consumed by the motor 214 of the hydraulic pump, and consequently the disclosed SOS 200 will remain a net consumer of power and will not produce more energy than it consumes.

Controlling the Seal Oil Pressure

As will be appreciated, the hydraulic pump 202 controls only the seal oil flow rate within the system. This hydraulic pump 202 can be run either at a fixed speed (resulting in a constant flowrate, or at a variable speed to provide variable flow in order to control temperature of the seals of the process pump 206. When the seals of the process pump 206 produce little heat (heat production of the seals depends on seal pressure, seal speed, seal design), or if it is desired to use the seal heat to warm up the SOS 200 (for example after a cold start in Winter weather) the hydraulic pump 202 would be run at a lower speed. If the temperature increases in the seals and it is desired to use the seal oil to remove the heat from the seals 206 more quickly to maintain a certain temperature increase limit, the hydraulic pump 202 can be run faster. A fixed speed hydraulic pump 202 would always run at "max required" speed, which means it would waste energy when full speed is not required.

The hydraulic motor 218 operates as a pressure control machine and throttles the flow delivered by the hydraulic pump 202. With such an arrangement, if the hydraulic pump 202 and the hydraulic motor 218 run at the same capacity, the pressure within the SOS 100 would be zero. Running the hydraulic motor 218 slower than the hydraulic pump 202 will build up backpressure in the SOS 200. In extreme cases, when the feeding pump 202 runs too slow, the feeding pump may run backward to build up backpressure so as to maintain sufficient system pressure to allow safe system shutdown. Such an arrangement could be used as an emergency function in case of feeding pump failure.

Speed of the hydraulic pump 202 is controlled by the VFD 216. In some embodiments the VFD 216 can be coupled to both the motor 214 of the hydraulic pump 202 and the motor 220 of the hydraulic motor 218 (in such an embodiment, the additional VFD 222 is eliminated). Energy generated by the VFD (from the hydraulic motor 218) can be suppled directly to the motor 214 of the hydraulic pump 202, and thus the generated energy is used internally to the SOS 200. As previously noted, the motor/generator 220 of the hydraulic motor 218 will never produce more energy than the motor 214 of the hydraulic pump 202 consumes, and thus the system 200 will never become a net power producer.

In some embodiments the hydraulic motor 218 can be used to control flow of oil through the SOS 200, while the hydraulic pump 202 can be used control the system pressure. The hydraulic motor 218 can be run on temperature control (e.g., the temperature of the seals associated with the process pump 206 or the temperature of the seal oil in the recirculation tank 212), while still recuperating energy. In such a case, the motor 214 of the hydraulic pump 202 will run on pressure control (e.g., pressure of the seal oil in SOS 200), consuming energy while building up the pressure required while pumping against the hydraulic motor 218. In some instances, the motor 204 of the hydraulic pump 202 will run faster to pump against the backpressure of the hydraulic motor 218.

As previously noted, a controller 224 may be used to control the VFDs 216, 222 of the SOS 200. In some embodiments the controller 224 also controls operation of the process pump 206. It will be appreciated, however, that in many embodiments the controller 224 may not control operation of the process pump 206. In such instances the controller 224 may communicate with a controller (not shown) associated with the process pump 206 to receive information about the operation of the process pump therefrom. For example, the controller of the process pump 206 may provide pressure information and/or other operational information to the controller 224, which may then be used to control one or more of the hydraulic pump 202 and the hydraulic motor 218. In addition, the controller 224 may provide operational information to the controller of the process pump 206. For example, if the temperature of the fluid in the recirculation tank 212, the controller 224 may communicate this information to the controller of the main pump. The controller 224 may sense local temperature and pressure parameters and may alert the controller associated with the process pump 206 if one or more parameters are outside of desired predetermined ranges. As will be appreciated, the system 200 can include multiple distributed sensors coupled to the controller 224 to provide such local temperature and pressure values to the controller.

The controller 224 may control one or both of the hydraulic pump 202 and the hydraulic motor 217 to ensure the SOS 200 operates within desired parameters. As a safety feature, one or more conventional pressure control valves (PCVs) (not shown) can be installed either upstream or downstream of the hydraulic motor 218. Such a PCV would be installed downstream of the process pump 206 and upstream of the cooler 210, as the cooler is intended to be operated at low pressures. This arrangement could reduce total efficiency of the system but could provide safety advantages. Optionally, the disclosed pumps and motors can be installed in multiple numbers, redundantly and in parallel, so that they can be switched over to a standby pump/motor when necessary. Optional equipment can be installed in parallel to allow for redundancy, wider operating range, and/or enhanced efficiency. For example, hydraulic pump 202 can include a pair of hydraulic pumps installed in parallel. In such embodiments, the parallel pumps can have the same performance profile as each other so as to be completely redundant, or they can be provided with different performance profiles to allow for flexible selectable operation of the SOS 200. Similarly, the hydraulic motor 218 can consist of two or more hydraulic motors installed in parallel to allow for redundancy, wider operating range, and/or enhanced efficiency. In such embodiments, at least require one check valve (not shown) would be included downstream the hydraulic pump 202. An automatic valve (not shown) would be installed upstream of each hydraulic motor 218 in order to guide flow to the desired hydraulic motor 218.

As will be appreciated, the aforementioned optional parallel installation of pumps and motors can build up redundancy and increase the system reliability or can enlarge the operating range and can improve the efficiency. For example, one hydraulic pump may be used to feed several consumers (e.g., mechanical seals), while several parallel pumps may be used to feed several consumers independently. Moreover, one motor can be used to throttle the flow coming from one or several consumers, while several parallel motors can be used to throttle flow coming from several consumers individually.

In some embodiments the SOS 200 can be implemented to detect leaks in the SOS. While the SOS 200 is free from leakage, the hydraulic pump 202 and the hydraulic motor 218 will handle exactly the same flow. Due to the need to build up pressure in the SOS 200, however, the hydraulic pump 202 and hydraulic motor 218 will operate on a certain, predictable speed offset. This offset can be predicted and monitored over time. When the offset is observed to change (e.g., by the controller 224), it can be predicted that there is either increased wear on hydraulic pump 202 or the hydraulic motor 218, or flow losses are occurring somewhere between the hydraulic pump and the hydraulic motor—indicating seal leakage. While the mechanical seal of the process pump 206 will cause flow losses during operation, such losses are very small when the seal is operating normal. Mechanical seals have a limited lifetime, and at the end of their lifetime the leakage rate will increase. Due to the higher pressure in the seal oil (barrier fluid) the leakage will cause a loss of seal oil. By carefully supervising the speed offset between the hydraulic pump 202 and the hydraulic motor 218, an increased leak rate can be identified early, and an alarm can be generated to stop the process pump 206.

It will be appreciated that although the description herein proceeded in relation to three-screw (3S) pumps, the principles of the invention could be applied using two-screw (2S) pumps, progressing cavity (PC) pumps, gear pumps, vane pumps, and lobe pumps, or combinations thereof.

Advantages of the disclosed system are:
Very stable and reliable SOS
Optimized seal pressure and temperature control
Pulsation and sudden pressure peak free operation
Very soft pressure control, especially during start and stop sequences
Simple symmetric SOS design
Same spare parts for hydraulic pump and motor
Almost wear free operation of the PR-PCV
Low noise—PR-PCV operates without high velocities
Recuperation of >50% of the hydraulic energy
Cost and space savings by using a smaller cooler
Less shear on the barrier fluid (oil) will increase the oil lifetime (less oil change intervals)
Very fast, soft and predictable pressure setting over the entire flow and pressure range (10 to 120% flow, 0 to 120% pressure)
Seal leak detection
Wear detection of hydraulic pump
Wear detection of PR_PCV (hydraulic motor)

Energy savings of 50% and more are easily possible by using an intelligent highly efficient SOS, replacing conventional PCV by power recuperating PCVs (PR-PCV). Main benefits will be the very smooth, quiet and reliable operation of the SOS.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

The above described function of the Seal-Oil-System need to be understood as one typical example of a hydraulic system which is intended to control flow, pressure and temperature of a fluid required by a consumer.

What is claimed is:

1. A seal oil system, comprising:
a hydraulic pump having a motor, the hydraulic pump configured to draw seal oil from a reservoir and to direct the seal oil to a seal region of a process pump;
a hydraulic motor having a motor/generator, the hydraulic motor coupled downstream of the seal region of the main pump to receive the seal oil from the seal region of the process pump, and
at least one variable frequency drive (VFD) coupled to the motor/generator, the at least one variable frequency drive configured such that energy generated by the motor/generator, driven by the hydraulic motor, is fed into a power grid from which the hydraulic pump draws energy.

2. The seal oil system of claim 1, wherein the hydraulic pump and the hydraulic motor are positive displacement pumps.

3. The seal oil system of claim 2, wherein the hydraulic pump and the hydraulic motor are selected from the list consisting of three-screw (3S) pumps, two-screw (2S) pumps, vane pumps, progressing cavity (PC) pumps, gear pumps, and lobe pumps.

4. The seal oil system of claim 1, wherein the seal region comprises one or more double mechanical seals.

5. The seal oil system of claim 1, further comprising a cooler coupled to the hydraulic motor to receive the seal oil from the hydraulic motor and to cool the seal oil therein.

6. The seal oil system of claim 1, wherein a speed of the hydraulic pump is controlled via a gear box or a variable frequency drive.

7. The seal oil system of claim 1, wherein the hydraulic pump, the motor/generator, and the variable frequency device together comprise a pressure-reducing pressure-control valve (PR-PCV).

8. The seal oil system of claim 7, wherein the hydraulic pump is configured to feed one or more consumers, and wherein several said pressure-control valves are provided in parallel to control flow and pressure for several consumers independently.

9. The seal oil system of claim 1, wherein the at least one variable frequency drive comprises a two axis variable frequency drive to control a speed of the hydraulic pump and to control a speed of the hydraulic motor, the two axis variable frequency drive configured to feed energy generated by the motor/generator to the motor of the hydraulic pump.

10. The seal oil system of claim 1, further comprising a controller for monitoring a speed of the hydraulic pump and a speed of the hydraulic motor, and to determine when a difference between the hydraulic pump speed and the hydraulic motor speed exceeds a predetermined value, and to generate an alarm.

11. The seal oil system of claim 1, wherein a speed of the hydraulic motor is controlled by a mechanical speed control device.

12. The seal oil system of claim 11, wherein the mechanical speed control device comprises a gearbox.

13. The seal oil system of claim 1, wherein the hydraulic pump is configured to control system pressure and the hydraulic motor is configured to control system flowrate.

* * * * *